United States Patent
Richman et al.

(10) Patent No.: US 10,877,961 B1
(45) Date of Patent: Dec. 29, 2020

(54) TECHNOLOGIES FOR COLLECTING NETWORK-BASED INFORMATION

(71) Applicant: TAM-C Solutions, LLC, Phildelphia, PA (US)

(72) Inventors: Aaron Richman, Jerusalem (IL); Ety Richman, Jerusalem (IL)

(73) Assignee: TAM-C Solutions, LLC, Philadelphia, PA (US)

( * ) Notice: Subject to any disclaimer, the term of this patent is extended or adjusted under 35 U.S.C. 154(b) by 76 days.

(21) Appl. No.: 16/146,949

(22) Filed: Sep. 28, 2018

Related U.S. Application Data

(60) Provisional application No. 62/565,804, filed on Sep. 29, 2017.

(51) Int. Cl.
| | | |
|---|---|---|
| *G06F 15/16* | (2006.01) | |
| *G06F 16/23* | (2019.01) | |
| *H04L 29/08* | (2006.01) | |

(52) U.S. Cl.
CPC ...... *G06F 16/2379* (2019.01); *H04L 67/1097* (2013.01); *H04L 67/306* (2013.01)

(58) Field of Classification Search
CPC ............. G06F 16/2379; H04L 67/1097; H04L 67/306
USPC .................................................. 709/206, 217
See application file for complete search history.

(56) References Cited

U.S. PATENT DOCUMENTS

| | | | | |
|---|---|---|---|---|
| 2007/0198506 A1* | 8/2007 | Attaran Rezaei | ... | G06F 21/6218 |
| 2009/0157417 A1* | 6/2009 | Bradley | ............. | G06Q 30/0185 |
| | | | | 705/318 |
| 2011/0258118 A1* | 10/2011 | Ciurea | ................... | G06Q 40/00 |
| | | | | 705/44 |
| 2013/0041906 A1* | 2/2013 | Adar | ........................ | G09B 7/00 |
| | | | | 707/750 |
| 2014/0282136 A1* | 9/2014 | Marantz | ................ | G06F 3/0484 |
| | | | | 715/764 |
| 2015/0356086 A1* | 12/2015 | Kamotsky | ............. | G06F 16/954 |
| | | | | 707/731 |
| 2017/0344552 A1* | 11/2017 | Golbandi | .......... | G06F 16/24578 |
| 2019/0082220 A1* | 3/2019 | Ouyang | ............. | G06Q 30/0251 |

* cited by examiner

*Primary Examiner* — Liang Che A Wang
(74) *Attorney, Agent, or Firm* — Dentons US LLP

(57) ABSTRACT

A server configured to: read a first content of a data source based on an identifier received from a client, perform an analysis of the first content based on a second content of a data structure responsive to the first content meeting a criterion received from the client, run an analytic on the first content responsive to the first content meeting the criterion, generate a message based on the first content after the analysis and the analytic, generate a rating for the message based on the analysis and the analytic, and present the message based on the rating in an inbox accessible to the client.

14 Claims, 4 Drawing Sheets

TECHNOLOGIES FOR COLLECTING NETWORK-BASED INFORMATION

CROSS REFERENCE TO RELATED APPLICATIONS

The present application claims the benefit of U.S. Provisional Application Ser. No. 62/565,804 filed 29 Sep. 2017, each of which is incorporated herein by reference in its entirety.

TECHNICAL FIELD

This disclosure relates to computing and computer networks.

BACKGROUND

There is a desire for a technology to enable a collection of network-based information. However, such technology does not exist. Therefore, this disclosure enables such technology.

SUMMARY

According to an embodiment of this disclosure, a system comprises: a server configured to: read a first content of a data source based on an identifier received from a client, perform an analysis of the first content based on a second content of a data structure responsive to the first content meeting a criterion received from the client, run an analytic on the first content responsive to the first content meeting the criterion, generate a message based on the first content after the analysis and the analytic, generate a rating for the message based on the analysis and the analytic, and present the message based on the rating in an inbox accessible to the client.

According to an embodiment of this disclosure, a system comprises: a server configured to: analyze a content scraped from a data source, update a record of a database based on the content being reflected in the record, generate a rating for the record as updated, insert the rating into the record, and take an action based on the record responsive to the rating in the record satisfying a threshold.

Note that this disclosure is embodied in various forms illustrated in a set of accompanying illustrative drawings and variations are contemplated as being a part of this disclosure, limited only by a scope of various claims recited below.

BRIEF DESCRIPTION OF DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

DETAILED DESCRIPTION

This disclosure is now described more fully with reference to the set of accompanying illustrative drawings, in which various example embodiments of this disclosure are shown. However, note that this disclosure can be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Figure 1:
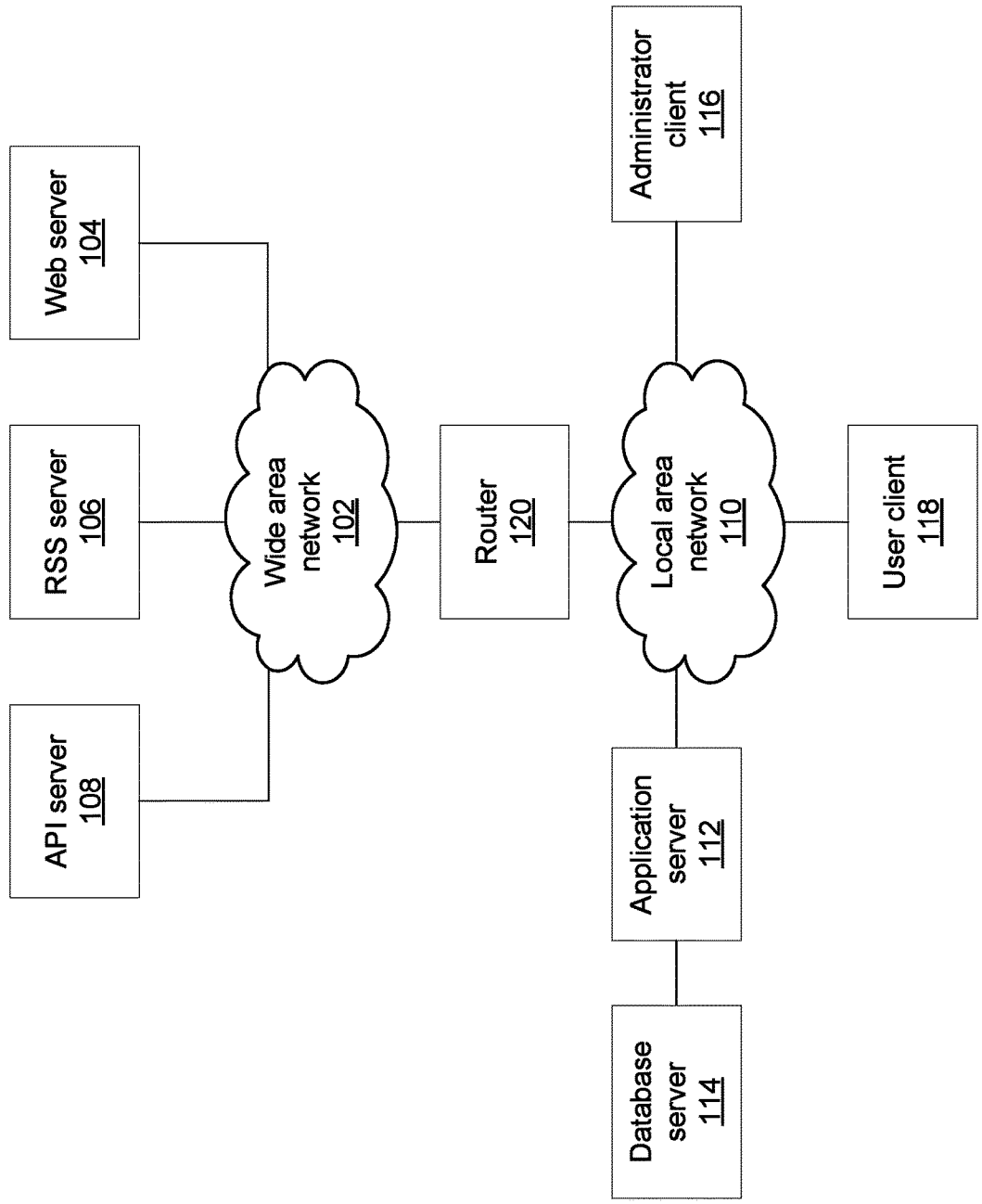
FIG. 1 shows a schematic diagram of an embodiment of a network topology according to this disclosure.

FIG. 1 shows a schematic diagram of an embodiment of a network topology according to this disclosure. In particular, a system 100 includes a wide area network (WAN) 102, a web server 104, a Really Simple Syndication (RSS) server, an Application Programming Interface (API) server, a local area network (LAN) 110, an application server 112, a database server 114, an administrator client 116, a user client 118, and a router 120. The web server 104, the RSS server 106, and the API server 108 are in communication with the WAN 102 and in some embodiments with each other. Note that at least two of the web server 104, the RSS server 106, or the API server 108 can be embodied as a single logical unit. The application server 112, the administrator client 116, and the user client 118 are in communication with the LAN 110. The router 120 communicates with the WAN 102 and the LAN 110 such that the WAN 102 and the LAN 110 can communicate with each other.

The web server 104 serves a web page when such service is requested, such as a news website, a blog, or others. The RSS server 106 serves an RSS feed when such service is requested. The API server 108 serves an access to an API, such as a social networking service API, when such service requested.

The application server 112 hosts a software application and a set of logic for the software application, such as a file comprising a plurality of criteria and a plurality of values corresponding thereto, such as a spreadsheet file, a comma separated values (CSV) file, or others, whether stored locally or via a network-based file service. For example, the application server 112 can comprise an IBM WebSphere application server, a SAP Web application server, or others.

The application server 112 can comprise a plurality of independent cores, such as a multicore processor comprising a computing component with two or more independent processing units, which are the units that read and execute program instructions, such as via multiprocessing or multithreading. The instructions are processing instructions, such as add, move data, or branch, but the cores can run multiple instructions concurrently, thereby increasing an overall operational speed for the software application, which is amenable to parallel computing. The cores can process in parallel when concurrently accessing a file or any other data structure, as disclosed herein, while being compliant with atomicity, consistency, isolation, and durability (ACID) principles, which ensure that such data structure operations/transactions, such as read, write, erase, or others, are processed reliably, such as for data security or data integrity. For example, a data structure can be accessed, such as read or written, via at least two cores concurrently, where each of the cores concurrently processes a distinct data structure record or a distinct set of data such that at least two data structure records or at least two sets of the data are processed concurrently, without locking the data structure between such cores. However, note that data locking is possible. Note that there can be at least two cores, such as two cores, three cores, four cores, six cores, eight cores, ten cores, twelve cores, or more. The cores may or may not share caches, and the cores may or may not implement message passing or shared-memory inter-core communication methods. Common network topologies to interconnect cores include bus, ring, two-dimensional mesh, and crossbar. Homogeneous multi-core systems include only identical cores, heterogeneous multi-core systems can have cores that are not identical. The cores in multi-core systems may implement architectures, such as very long instruction word (VLIW), superscalar, vector, or multithreading. In some embodiments, at least one of the database server 114, the administrator client 116, or the user client 118 can comprise a plurality of independent cores, such as a multicore processor comprising a computing component with two or more independent processing units, which are the units that read and execute program instructions, such as via multiprocessing or multithreading, as disclosed herein. Such configurations may enable parallel processing of relevant information, as disclosed herein, such as when used via many users for various tasks disclosed herein and thereby efficiently increase system computational speed.

The database server 114 hosts a database and a database management system (DBMS), such as an Oracle database, a MS-SQL database, an MS Access database, a Filemaker database, a DB2 database, or others. The DBMS manages the database. The application hosted on the application server 112 can communicably interface with the DBMS in order to request various database operations, as disclosed herein, such as creating records, modifying records, retrieving records, searching records, identifying records, deleting records, sorting records, or others, in whole or in part. For example, some of various database input (I)/output (0) operations include reading, writing, editing, deleting, updating, searching, selecting, merging, sorting, erasing, formatting, or others. The DBMS can implement record locking on the database, such as for data integrity purposes. In some embodiments, the DBMS can avoid record locking.

The database stores data, whether in a raw state, a formatted state, an organized stated, or any other accessible state, and allows access to such data. The database can be a single database or a plurality of databases, whether hosted on a single machine or a plurality of machines, whether in a single data center or distributed among a plurality of data centers. The database can comprise at least one of a relational database, a non-relational database, a post-relational database, an in-memory database, a hybrid database, an Extensible Markup Language (XML) database, a parallel database, a distributed database, a graph database, a mobile database, an operation database, a probabilistic database, a real-time database, a spatial database, a temporal database, an object oriented database, an unstructured data database, a terminology oriented database, NoSQL, or others.

The administrator client 116, such as a desktop, a laptop, a tablet, a phone, or others, is programmed to allow maintenance or troubleshooting of at least one of the LAN 110, the application server 112, the database server 114, or the user client 118. Such maintenance or troubleshooting can involve application or file settings, application or file versioning, data structure maintenance, software updates, debugging, access control, simulation, event logging, event monitoring, automation, or others. Note that the administrator client 116 has more or higher system privileges to at least one of the LAN 110, the application server 112, the database server 114, or the user client 118 than the user client 118.

The user client 118, such as a desktop, a laptop, a tablet, a phone, or others, is programmed to run a software application on an operating system (OS), such as Windows, Linux, Android, MacOS, and/or others, with the software application on the user client 118 being configured to interface with the software application on the application server 112 over the LAN 110. The application on the user client 118 is programmed to display a GUI, as disclosed herein, with the GUI being operated via an input device of the user client 118, such as a keyboard, a cursor device, a microphone, a camera, or a touchscreen. The user client 118 can communicate the input to the application server 112 via the LAN 110. In response, the application server 112 can perform various data operations, as disclosed herein, such as to execute the software application and the logic for the software application accordingly or request the DBMS to identify or modify various records in the database hosted on the database server 114.

In one mode of operation, in an intelligence collection effort, the application server 112 is configured to read a first content of a data source, such as at least one of the web server 104, the RSS server 106, or the API server 108, based on an identifier, such as a Uniform Resource Locator (URL), received from the user client 118. The application server 112 is configured to perform an analysis of the first content based on a second content of a data structure, such as via comparing the first content against a table of terms and corresponding scores and identifying a matching entry among the terms, responsive to the first content meeting a criterion, such as a text string, received from the user client 118. For example, the analysis can output a first score. The application server 112 is configured to run an analytic, such as natural language processing based on syntax, semantics, discourse, or speech, on the first content responsive to the first content meeting the criterion. For example, the analytic can output a second score. The application server 112 is configured to generate a message based on the first content, such as via copying a portion of the first content, after the analysis and the analytic. The application server 112 is configured to generate a rating for the message based on the analysis and the analytic, such as via tallying the first score and the second score. The application server 112 is configured to present the message based on the rating in an inbox accessible to the user client 118, such as when the rating satisfies or does not satisfy a predetermined threshold associated with the user client 118.

In another mode of operation, in an intelligence collection effort, the application server 112 is configured to analyze a content scraped from a data source, such as at least one of the web server 104, the RSS server 106, or the API server 108. The application server 112 is configured to update a record of a database, such as hosted via the database server 114, based on the content being reflected in the record, such as literally or conceptually. The application server 112 is configured to generate a rating for the record as updated, such as based on analyzing the content against a table of terms and corresponding scores and identifying a matching entry among the terms. The application server 112 is configured to insert the rating into the record, such as into a field of the record. The application server 112 is configured to take an action based on the record responsive to the rating in the record satisfying a threshold, which can be preset via the user client 118. For example, the action can include prompting a message or an alert on the user client 118, such as within an messaging application, such as within an inbox.

Figure 2:
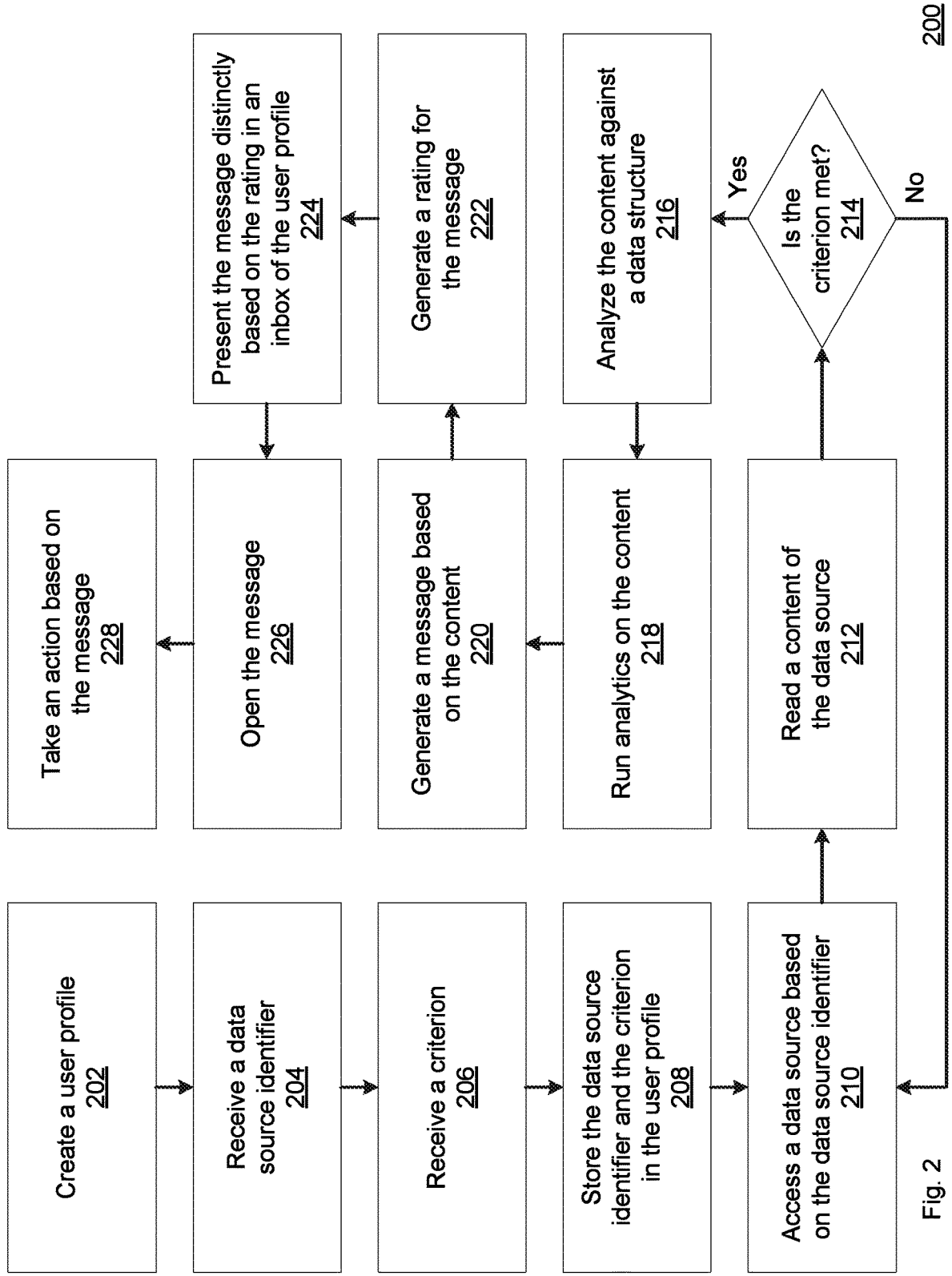
FIG. 2 shows a flowchart of an embodiment of a method for collecting network-based information according to this disclosure.

FIG. 2 shows a flowchart of an embodiment of a method for collecting network-based information according to this disclosure. In particular, a method 200 is performed via the network topology 100.

In block 202, the application server 112 create a user profile based on the user client 118 communicating with the application server 112 over the LAN 110. The user profile can be stored on the application server 112 or the database server 114. For example, the user profile can include a user name, a password, a plurality of user preferences/settings for interacting with the application server 112 or the database server 114.

In block 204, the application server 112 receives a data source identifier from the user client 118 over the LAN 110. For example, the data source identifier can include a URL or any other form of data enabling the application server 112 to identify a data source, such as at least one of the web server 104, the RSS server 106, or the API server 108. In situations when the data source requires login/password, then the application server 112 can use the login/password as received from the user client 118, such as a social networking service avatar.

In block 206, the application server 112 receives a criterion from the user client 118 over the LAN 110. The criterion can include a text, an image, a sound, or others. For example, the criterion can be defined for an entity record, where the criterion can include various parameters, such as a time period (amount of time that has passed since a specific date or an event), a location coordinate or name or landmark (aerial distance between a first geographic location of an event to a second geographic location—this may depend on embedding a mapping component—possible to calculate geographic places (continent, country, city, neighborhood, or others), a content (alphanumeric word or expression that appears in notification content). For example, the criterion can include a complex search phrase that includes negative, positive, similar expressions, or others (can be simulated in order to get desired results). Note that the criterion has a numerical value associated therewith such that the value can be positive or negative and the application server 112 can tabulate the numerical value of the criterion. Therefore, the application server 112 is configured to identify an event of interest when the event's score passes a certain numerical threshold that is determined for the entity record.

In block 208, the application server 112 stores the data source identifier and the criterion in the user profile, whether on the application server 112 or the database server 114 over the LAN 110.

In block 210, the application server 112 accesses a data source, such as at least one of the web server 104, the RSS server 106, or the API server 108, based on the data source identifier over the LAN 110 via the router 120. For example, if the data source identifier is a URL, then the application server 112 can access the web server 104 based on the URL.

In block 212, the application server 112 reads a content of the data source. For example, when the web server 102 serves a web page responsive to a request from the application server 112, then the application 112 reads the web page. Note that when the content is in a language different from the criterion or the user client 112, as obtained from the OS of the user client 112, then the application server 112 can translate the content, whether locally or via querying a translation engine, such as Google Translate, over the WAN 102.

In block 214, the application server 112 determines whether the content read from the data source meets the criterion as previously input via the user client 118. For example, the application server 112 determines whether the content contains a text of the criterion. For example, if the criterion is a term "package" and the application server 112 determines that the content contains the term "package," then the criterion has been met. Otherwise, the application server 112 iterates to block 210.

In block 216, the application server 112 analyzes the content against a content of a data structure. For example, the data structure includes a file or a database that stores a dictionary of terms and values, as input via the user client 118 or the administrator client 120. For example, the dictionary can list a plurality of terms and a plurality of numerical values in a tabular format where the terms correspond to the numerical values in a one-to-one manner. For example, if the criterion is a term "package" and the application server 112 determines that the content contains the term "package" and the term "package" appears among the terms in the dictionary, then the application server 112 looks up a numerical value corresponding to the term "package" and copies the numerical value for later use. As such, the application server 112 can output a first score. However, note that if the criterion includes an image or sound, then similar suitable processing may be performed, such as pattern recognition, object recognition, waveform analysis, or others.

In block 218, the application server 112 runs an analytic on the content. For example, the analytic may involve natural language processing based on syntax, semantics, discourse, speech, or others. For example, the analytic may involve proximity search on the content when the content involves a paragraph of text. As such, the application server 112 can output a second score.

In block 220, the application server 112 generates a message based on the content. For example, the application server 112 can copy the content, identify a template related to the content, such as based on data source or terminology, and insert the content, as copied, into the template.

In block 222, the application server 112 generates a rating for the message based on the first score and the second score, such as via tallying the first score and the second score. Note that each of the first score and the second score can be positive or negative so the tallying can involve different types of mathematical operations, especially when many criterions are used. Note that the first score, the second score, or the rating can be used via the application server 112 to run a heuristic or historical analysis for statistical data gathering and machine learning in order to improve the software application on the application server 112.

In block 224, the application server 112 presents the message distinctly as rated in an inbox of the user client 118 over the LAN 110. The message can be presented distinctly based on position of the message, such as higher rated messages are moved higher in a message pane, while lower rated messages are moved lower in the message pane, or vice versa. The message can also be presented distinctly based on graphics, such as such as higher rated messages are have more or different colors, fonts, sizes, highlighting, background, framing, or vice versa. Note that the message can contain the content, whether as originally read or as translated or otherwise edited. In block 226, the application server 112 receives a request from the user client 118 over the LAN 110 to open the message. In some embodiments, the inbox is an email inbox, a text message textbox, a social networking service inbox, an messenger inbox, an inbox dedicated solely to the message, or others.

In block 228, the application server 112 or the client 118 take an action based on the message. For example, the action can include sharing the message (which may involve a pre-drafted template in draft mode customized in content/format/addressee/attachments based on the message via a set of rules preset in the application server 112), whether internally, such as with the administrator client 116 over the LAN 110, or externally, prompting an alert based on the message, marking the message as relevant or irrelevant (including for other entity records), printing the message, search for messages in the inbox or archived that are similar in content/format/attachments/metadata/parameters, add an attachment (which may be another message from associated with this entity record or another entity record), activating an alarm based on the message, archiving the message, supplementing the message, such as adding information about the message (source of message, date, or location of an event reflected in the message) and classifying the message according to a topic, whether predetermined or created via the user client 118, whether at that time frame or well in advance. Note that if the action is not taken within a set time period, such as 15 minutes within receipt of the message within the inbox, then the application server 112 or the user client 118 can generate and send or output an alert to the user client 118 or the administrator client 116. Further, note that the application server 112 can present a dashboard to display various inbox statistics for the user client 118, over a preset time period. For example, the dashboard can display a number of new messages received, a number of messages that are being processed, a number of messages that have been completely processed, a number of messages sent to the archive, a number of messages marked as relevant, or others.

Note that the inbox can present the messages as categorized in various statuses. For example, the message has a status that marks a stage in which the message is located within its processing process. This status determines various possible actions and division of responsibilities between various user clients 118, such as when the user clients 118 are associated with various entity records. The statuses are: New—message that just arrived from the external source and has not yet been dealt with at all, Edited—message that the user client 118 has begun to edit or has not yet decided if the message is relevant or not, Irrelevant—message that the user client 118 decided is not relevant, Relevant— message that the user client 118 decided may be relevant for at least one entity record, Approved—message that the user client 118 decided is relevant for at least one of entity record, or Rejected—message that was defined as relevant by the user client 118, but other user clients 118 IO marked as irrelevant.

Note that the message can have various data associated therewith. For example, the data can include Title, Source, Desk, Researcher, Status, Relevant entity records, Irrelevant entity records, Linked events, Information on original message, Original message title, Original message content, Original message link, Original message date, Original message time, Information about the message after editing, Edited message content, Event geographic location, Event date, Event time, Attached files, Automated information for important message identification mechanism, Original rating, Original importance, Final rating, Final importance, Automated information for analysis process, Creation date+Time, Editing start date+Time, Editing end date+Time, Analysis start date+Time, Analysis end date+Time, Verification date+Time, Client alert date+Time, Entity record report date+Time, or others.

Note that the data source identifier can include various data associated therewith. For example, the data include Name, Description, Source Type, Feed, Track, Facebook, Twitter, Geographic location, or others.

Note that the entity record is created manually by the administrator client 116 via the application server 112 at the database server 114 over the LAN 110. Likewise, the administrator client 116 associates the user client 118 with the entity record. For example, the entity record can contain a code name, an email address, a phone number, a communication preference, a list of authorized users who can access or read the message associated with the entity record, or others.

Note that the administrator client 116 can edit various settings on the application server 112. For example, some of the settings include a Maximum delay time for processing item by the user client 118 (10 minutes), a Maximum delay time for analyzing relevant item by administrator client 116 (20 minutes), a Maximum delay time for updating an event by the user client 118 responsible for the event (10 minutes), a Maximum delay time for editing an alert for the entity record (10 minutes), a Maximum delay time for approving an alert for the entity record by a different user client 118 (10 minutes), or others.

Note that the inbox can navigate to or be concurrently presented with a map interface, such as Google Maps. For example, in order to allow the user client 118 to mark a location of an event on a map, and to enable the user client 118 associated with the entity record to define conditions for important notifications based on location, the map interface includes an ability to convert an address name to a set of geographic coordinates. The map interface includes an address search field and display the address search field on a map and an option to mark a location on the map manually via the user client 118. Alternatively, the geographic coordinates can be determined via a place tree.

When the user client 118 needs to generate a report, a word processor may be used, such as Google Drive, MS Word, or others. Therefore, when the user client 118 is prompted to create a new periodic report or to edit an existing periodic report, the application server 112 create a new document file for a report in a personal drive associated with the user client 118, which may be external to the user profile of block 202. When the user client 118 saves the document file, then the application server 112 will save document in a .DOC format and a PDF format in its database on the database server 114 and delete the document file from the personal drive.

Figure 3:
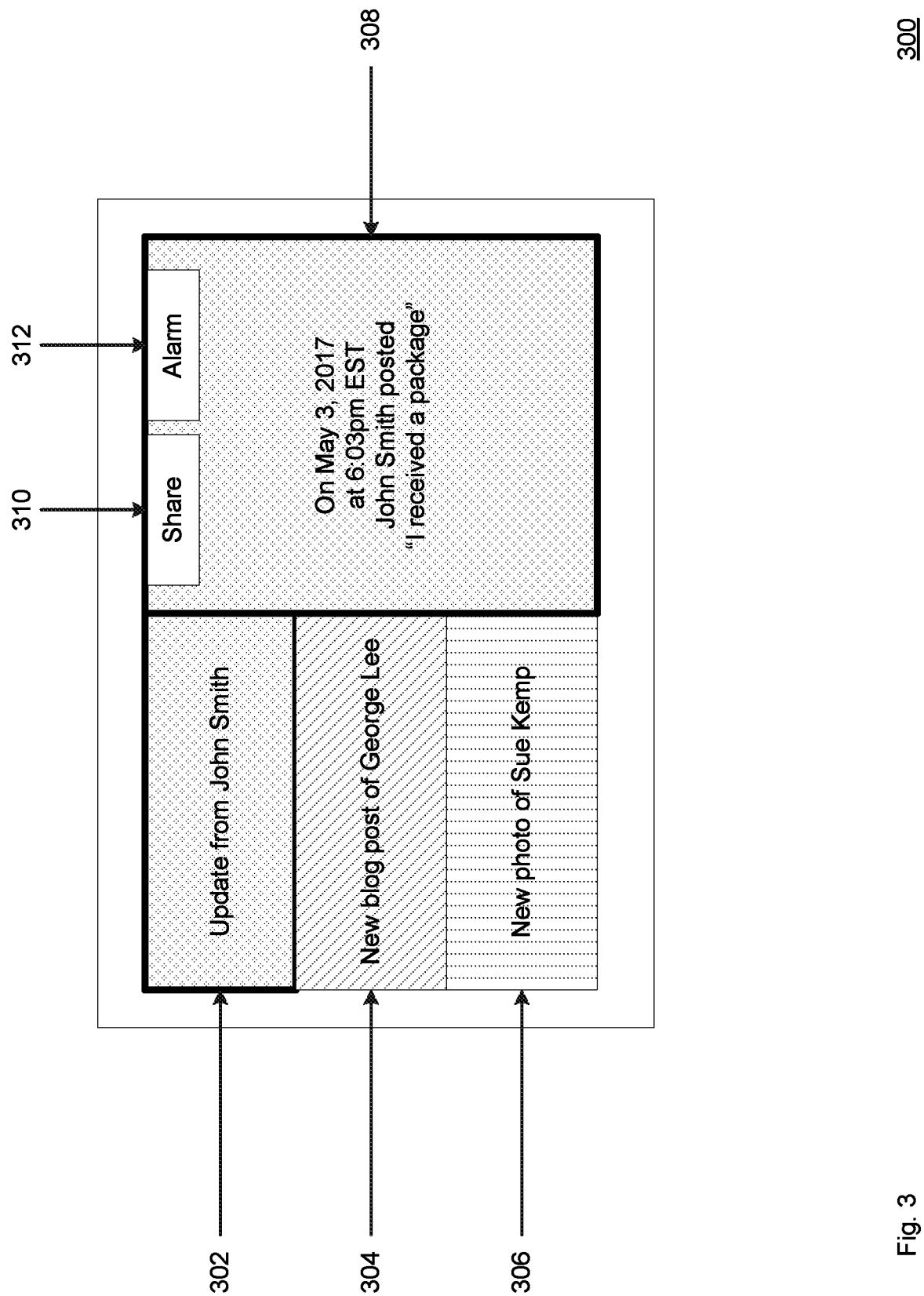
FIG. 3 shows a schematic diagram of an embodiment of a graphical user interface (GUI) containing a plurality of messages according to this disclosure.

FIG. 3 shows a schematic diagram of an embodiment of a GUI containing a plurality of messages according to this disclosure. In particular, the user client 118 accesses an inbox 300, whether on the server 112 over the LAN 110 or as run locally on the user client 118. For example, the inbox 300 can be populated via an Internet Message Access Protocol (IMAP), a Post Office Protocol (POP), a File Transfer Protocol (FTP), a Simple Mail Transfer Protocol (SMTP), a Telnet protocol, a Transport Layer Security (TLS) protocol, a Secure Sockets Layer (SSL) protocol, or others. For example, the software application, such as a browser, running on the user client 118 can interface with the application server 112 over the LAN 110 or a standalone application running on the client 118 can contain the inbox 300.

The inbox 300 includes a message pane and a reading pane. The message pane contains a message 302, a message 304, and a message 306. The reading pane contains a reading window 308 that depicts a share button 310 and an alarm button 312. The message 302 is selected for reading via the user client 118 and therefore is framingly bolded and graphically (background hatching) and positionally (placed uppermost) distinct from the message 304 and the message 306 based on the rating, as disclosed herein. If needed, the user client 118 can activate the share button 310 to share the message 302, whether internally over the LAN 110 or externally, such as via email, messaging, social networking, texting, or others. If needed, the user client 118 can activate the alarm button 318, which can activate a sequence of preset actions, such as generating a sound via the user client 118 or others, prompting an alert on the administrator client 116, calling a preset phone number, or others. Note that at least one of the share button 310 or the alarm button 312 can be statically presented (for all messages) in the reading pane or dynamically presented (for some messages selectively based on a rating of that message satisfying a predetermined threshold, a content of that message, a timing/date of that message, a data source of that message, or other any characteristic or parameter associated with that message).

Figure 4:
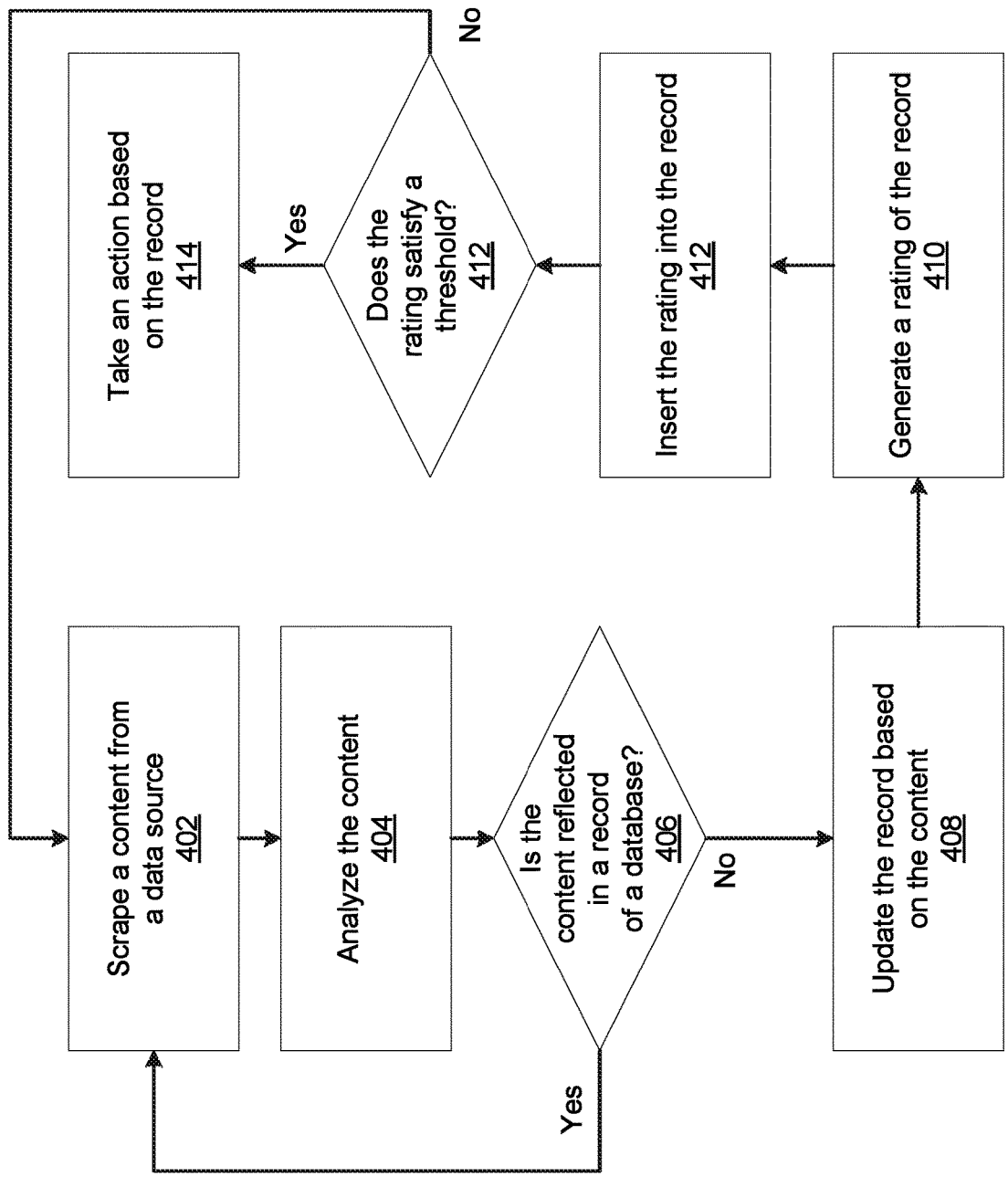
FIG. 4 shows a flowchart of an embodiment of a method for operating a database according to this disclosure.

FIG. 4 shows a flowchart of an embodiment of a method for operating a database according to this disclosure. In particular, a method 400 is performed via the network topology 100.

In block 402, the application server 112 scrapes a content from a data source, as disclosed herein. For example, the application server 112 can scrape the content copying/pasting, text pattern matching, a Hypertext Transfer Protocol (HTTP) programming, a Hypertext Markup Language (HTML) parsing, a Document Object Model (DOM) parsing, a vertical aggregation, a semantic annotation recognizing, a computer vision web-page analysis, or others in any modality of text, image (video), and sound. For example, the data source can be identifier via the data source identifier of as disclosed herein.

In block 402, the application server 112 analyzes the content, such as via natural language processing based on syntax, semantics, discourse, speech, or others. For example, the analysis may involve proximity search on the content when the content involves a paragraph of text. Note that when the content includes an image or a sound, then similar suitable processing may be performed, such as pattern recognition, object recognition, waveform analysis, or others.

In block 406, the application server 112 determines whether the content is reflected in a record of a database, such as the database hosted via the database server 114. The content can be reflected in the record literally or conceptually. For example, the content is reflected literally when the content is literally in the record, such as a term appearing word-for-word or letter-for-letter or number-for-number or character-for-character in a relevant field of the record. For example, the content is reflected conceptually when a concept of the content appears in a field of the record, whether or not the content is literally reflected in the record. Note that for the content to be conceptually reflected in the record, the application server 112 can perform various computational linguistic techniques on the content, such as semantical analysis, linguistic analysis, discourse analysis, speech analysis, disambiguation, normalization, fuzzy matching, topic relatedness, or others, in order to determine the concept in the content and then do similar techniques on a record or a relevant field in the record to determine whether the content is conceptually reflected in the record. Note that if the content includes an image or a sound, then similar techniques for images or sounds can be employed, as known to skilled artisans. If the application server 112 determines that the concept is already reflected in the record, then the application server 112 iterates to block 402.

In block 408, the application server 112 interfaces with the database server 114 to update the record based on the content since the content is not reflected in the record. The update can include modifying a field or adding a new field to the record in order for the record to contain the content.

In block 410, the application server 112 generates a rating of the record based on analyzing the record, as updated, against a data structure, whether locally or remotely stored. For example, the data structure includes a file or a database that stores a dictionary of terms and values, as input via the user client 118 or the administrator client 120. For example, the dictionary can list a plurality of terms and a plurality of numerical values in a tabular format where the terms correspond to the numerical values in a one-to-one manner. Therefore, when the application server 112 determines that a relevant field of the record reflects, whether literally or conceptually, a term from the terms in the dictionary, then the application server 112 looks up a corresponding numerical value for that term and generates a rating based on that numerical value.

In block 412, the application server 112 inserts the rating into the record, which can include updating a previous rating, or creates a new field in the record and inserts the rating into the new field.

In block 414, the application server 112 determines whether the record, with the record therein, satisfies a predetermined threshold, as input via the user client 118 or the administrator client 116. If the application server 112 determines that the record does not satisfy the predetermined threshold, then the application server 112 iterates to block 402.

In block 416, the application server 112 takes an action based on the record. For example, the action can include sharing the record (which may involve a pre-drafted template in draft mode customized in content/format/addressee/attachments based on the message via a set of rules preset in the application server 112), whether internally, such as with the administrator client 116 over the LAN 110, or externally, prompting an alert based on the record, marking the record as relevant or irrelevant (including for other entity records), printing the record, search for records in the database that are similar in schema/content/format/attachments/metadata/parameters, add an attachment (which may be another record from associated with this entity record or another entity record), activating an alarm based on the record, supplementing the record, such as adding information about the record (source of message, date, or location of an event reflected in the message) and classifying the record according to a topic, whether predetermined or created via the user client 118, whether at that time frame or well in advance. Note that if the action is not taken within a set time period, such as 15 minutes within determining that the record satisfies the predetermined threshold, then the application server 112 or the user client 118 can generate and send or output an alert to the user client 118 or the administrator client 116. Further, note that the application server 112 can present a dashboard to display various record statistics for the user client 118, over a preset time period.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks.

Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

In some embodiments, various functions or acts can take place at a given location and/or in connection with the operation of one or more apparatuses or systems. In some embodiments, a portion of a given function or act can be performed at a first device or location, and a remainder of the function or act can be performed at one or more additional devices or locations.

Various corresponding structures, materials, acts, and equivalents of all means or step plus function elements in various claims below are intended to include any structure, material, or act for performing the function in combination with other claimed elements as specifically claimed. Various embodiments were chosen and described in order to best explain various principles of this disclosure and various practical applications thereof, and to enable others of ordinary skill in a pertinent art to understand this disclosure for various embodiments with various modifications as are suited to a particular use contemplated.

Various diagrams depicted herein are illustrative. There can be many variations to such diagrams or steps (or operations) described therein without departing from various spirits of this disclosure. For instance, various steps can be performed in a differing order or steps can be added, deleted or modified. All of these variations are considered a part of this disclosure. People skilled in an art to which this disclosure relates, both now and in future, can make various improvements and enhancements which fall within various scopes of various claims which follow.

This detailed description has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

The invention claimed is:

1. A system comprising:
a server configured to:
read a first content of a data source based on an identifier received from a client,
determine at least one of the first content meeting or not meeting a criterion received from the client,
upon the content meeting the criterion, perform an analysis of the first content relative to a second content of a data structure to generate a first output, wherein the analysis comprises determining a correspondence between the first content and at least a portion of the second content of the data structure,
run an analytical process on the first content to generate a second output, wherein the analytical process comprises at least one of proximity search, pattern recognition, object recognition, waveform analysis, or natural language processing,
generate a message based on the first content after the analysis and the analytical process,
generate a rating for the message based on the first output and the second output, and
present the message based on the rating in an inbox accessible to the client.

2. The system of claim 1, wherein the message is a first message, wherein the inbox contains a second message, wherein the first message is presented more distinctly than the second message.

3. The system of claim 2, wherein the first message is presented more positionally distinct than the second message.

4. The system of claim 2, wherein the first message is presented more graphically distinct than the second message.

5. The system of claim 1, wherein the data source includes at least one of a web server, an RSS server, or an API server.

6. The system of claim 1, wherein the first content includes a text.

7. The system of claim 1, wherein the first content includes an image.

8. The system of claim 1, wherein the first content includes a sound.

9. The system of claim 1, wherein the criterion includes a text.

10. The system of claim 1, wherein the criterion includes a pattern.

11. The system of claim 1, wherein the second content includes a term and a score, wherein the first content is analyzed against the term such that the score is assigned to the first content upon matching and comprises the first output.

12. The system of claim 11, wherein the score is a first score, wherein the analytical process includes a data processing technique that is applied to the first content and that outputs a second score comprising the second output based on a recognition of a pattern in the first content.

13. The system of claim 12, wherein the rating is based on the first score and the second score.

14. The system of claim 1, wherein the natural language processing is based on at least one of syntax, semantics, discourse, or speech.

* * * * *